3,509,103
FURAN MODIFIED POLYURETHANE
Dwight Maxwell Teague, Detroit, and John H. Engel, Jr., Grosse Pointe, Mich., assignors to Chrysler Corporation, Highland Park, Mich., a corporation of Delaware
No Drawing. Filed Oct. 10, 1966, Ser. No. 585,328
Int. Cl. C08g 22/08
U.S. Cl. 260—77.5        8 Claims

ABSTRACT OF THE DISCLOSURE

This invention comprises the preparation of new resins composed of furan and urethane polymers by a process in which a furfuryl alcohol blocked polyisocyanate is reacted with a polyol. The furan-urethane resin product obtained is extremely resistant to all types of solvents and acids and has a very low degree of water vapor permeability thereby providing an excellent coating material for automobiles and the like.

---

This invention relates to organic resin compositions and to a process for their preparation. More particularly, it pertains to resin systems wherein the resin components can be blended and then stored for substantial periods without there occurring interreaction of the resin components. Still more particularly, it pertains to polymeric resins composed of both furan urethane based polymers.

Urethane based polymers have many desirable properties which make them of great value as foams, adhesives and coatings. However, the cost and handling problems involved with urethane systems frequently present a serious obstacle to their use. For example, the reactivity of the isocyanate radicals with compounds containing active hydrogen atoms often presents serious difficulties. Thus, the reaction between the active hydrogen containing compound and the isocyanate is frequently so rapid that the final reaction product is formed before the desired article or coating can be processed through the various steps required to fabricate the desired article. In order to overcome this problem, blocked isocyanate compounds have been developed which will not react with other polymer components with which it is blended when at room temperature. Such blocked isocyanates are isocyanate derivatives in which the isocyanate groups have been reacted with another compound to produce a urethane which, upon heating of the derivative, will react as if the isocyanate groups were regenerating.

Although blocked isocyanates have proved to be a valuable type of reactant in urethane chemistry their use has heretofore presented certain difficulties. For example, they materially add to the cost of a urethane polymer since the blocking agent is volatilized upon heating and is lost from the polymer system. Thus, there is the initial expense of preparing the blocked isocyanate as well as the subsequent loss from the polymer system of two mols of blocking agent, in the case of a completely blocked diisocyanate, for each mol of the isocyanate used in the polymer. Another disadvantage associated with the use of blocked isocyanates is gassing which results in the product urethane polymer having poor density and adhesion characteristics. Thus, coatings having a thickness greater than 10 mils are difficult to form since the blocking agent which is volatilized during unblocking has difficulty is diffusing from the polymer and becomes entrapped therein. Another problem encountered with blocked isocyanates stems from their toxicity. For example, phenol which has heretofore been widely used as a blocking agent is now the subject of antipollution and waste control legislation which prohibits its addition to public water sources. Still a further problem with heretofore used blocking agents is that many of them cannot be used in a system where amine reactants are employed because the amine will unblock the isocyanate even in the absence of heat. Since amines are widely used in urethane systems this presents a serious limitation. Efforts to overcome this amine-blocking agent compatibility problem have resulted in the use of certain blocking agents which are not unblocked by the mere presence of an amine. Unfortunately, this approach has presented yet another problem in that such blocked isocyanates must be heated to a relatively high temperature before they unblock and therefore they are not suitable in any applications where high temperatures are prohibited by either technical or economic factors.

Despite the above-mentioned problems associated with blocked isocyanate, their use in many urethane applications is a virtual necessity. For example, in the automotive industry it would be advantageous to coat certain body components such as fender shields with a urethane material so as to provide greater chip and corrosion resistance. However, in a high volume production system staffed by operating personnel who have a minimum of technical polymer training, it is absolutely essential that the coating composition have good shelf stability since the coating material would have to be prepared, perhaps stockpiled, and finally brought to the application site so as to eliminate any need for blending of the polymer components by the operating personnel. In addition, the polymer must have an excellent pot life since in most applications it will not be possible to constantly clear the dip or spray tanks and lines thereof so as to prevent the polymer from hardening in the equipment.

Accordingly, it is an object of this invention to provide a new resin composition.

A further object is to provide a new urethane polymer system synthesized with an isocyanate compound which is blocked with an agent which is nontoxic and which is capable of homopolymerization within the polymer system.

A still further object is to provide a process for preparing a new resin composition composed of urethane and furan units.

Other objects and advantages of this invention will become apparent from the detailed description thereof.

The new resin compositions of this invention are composed of a plurality of urethane units and a plurality of furan units. The new compositions are inexpensive and possess properties heretofore unobtainable in a polymer system economical enough for use in large scale, low cost applications. Thus, it has been known that furan resins are substantially insoluble in all common solvents and are extremely resistant to even the strongest of acids. Unfortunately, furan resins are also brittle, and hence, of little use in coatings where some degree of flexibility is essential. On the other hand, urethane polymers having excellent flexibility can be prepared, but these polymers have suffered the disadvantage of relatively high water vapor permeability. In attempting to obtain a single polymer system having the desirable properties of the urethane and furan based polymers, physical blends of these polymers were prepared. Such blends were not successful. Thus it was not possible to prepare a furan homopolymer of sufficiently low molecular weight to avoid imparting brittleness to the polymer mixture, and the urethane polymer continued to suffer from the above described disadvantages associated with blocked isocyanates.

The new compounds of the present inveniton are composed of chemically interconnected furan and urethane polymers and are the reaction product of a furfuryl alcohol blocked polyisocyanate and a polyol having at least two active hydrogen atoms. The furfuryl alcohol blocked polyisocyanate is the addition product of an organic isocyanate and furfuryl alcohol and can be shown structurally as follows:

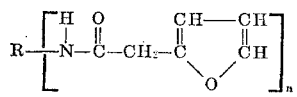

where R is an organic radical having from about 6 to 36 carbon atoms and $n$ is an integer greater than zero.

The unique resin compositions of this invention are attributable to the several unexpected properties of the above described blocked isocyanates. Thus, the furfuryl alcohol blocked isocyanates show excellent stability to amine catalysts and reactants, and, at the same time, have a relatively low unblocking temperature. Their low unblocking temperature of about 170° C. was totally unexpected in view of the fact that presently known primary alcohol blocked isocyanates require temperatures of over 200° C. to unblock. Even more surprising was the discovery that upon unblocking the furfuryl alcohol remained substantially in the polymer. Accordingly, gassing was not a problem and there was little or no waste of material due to the blocking agent being lost from the polymer system. Moreover, it was possible, as discussed hereinafter, to cause homopolymerization of the furfuryl alcohol and thereby form a urethane-furan polymer system having many desirable properties including a surprising and unexpected reduced water vapor permeability. Lastly, the furfuryl alcohol blocked isocyanates used in this invention are essentially odorless and of little or no toxicity as compared to presently used blocked isocyanates.

As stated above, the blocked isocyanates used in this invention are the reaction products of furfuryl alcohol and an organic isocyanate of the formula $R(NCO)_n$ where $n$ has a value greater than zero. Illustrative examples of suitable isocyanates for use in preparing the compounds of this invention are: ethyl, methyl, propyl, butyl, amyl, octyl, decyl, dodecyl, hexadecyl, octadecyl, allyl, isobutyl, cyclohexyl, phenyl, p-tolyl, m-chlorophenyl, and -naphthyl isocyanates, the alkylene diisocyanates such as propylene-1,2-diisocyanates, butylene-1,2-diisocyanate, butylene-1,3-diisocyanate, and butylene-2,3-diisocyanate, and DDI diisocyanate, the cycloalkylene diisocyanate such as cyclopentylene-1,3-diisocyanate, cyclohexylene-1,2-diisocyanate, cyclohexylene-1,3-diisocyanate and cyclohexylene-1,4-diisocyanate; the aliphatic aromatic diisocyanate such as xylene-1,4-diisocyanate and xylene-1,3-diisocyanate; the aromatic diisocyanates such as p-phenylene diisocyanate, 1-methyl, -2,4-phenylene diisocyanate, naphthylene-1,4-diisocyanates and diphenylene-4,4'-diisocyanate, and the alkyl substituted arylene diisocyanates such as the tolylene diisocyanates including the 65/35, 2,4–2,6 isomers and 80/20, 2,4–2,6 isomers thereof. In addition to mono and diisocyanates, polyisocyanates such as triphenylmethane triisocyanate, 1,3,5-triisocyanate benzene, 2,4,6-toluenetriisocyanate, and 4,4'-dimethyldiphenyl-methane-2,2', 5,5'-tetraisocyanate can also be used.

The blocked isocyanates preferred for use in the present invention are those of the above set forth formula in which $n$ has a value of at least two and R is derived from an isocyanate of the group: tolylene diisocyanate, 4,4'-diphenyl-methane diisocyanate, 1,6-hexamethylene diisocyanate, 3,3'-dimethoxy-4,4'-biphenyl diisocyanate, 3,3'-dimethyl-4,4'-biphenyl diisocyanate, and polymethylene polyphenylisocyanate.

The furfuryl alcohol blocked isocyanates used in this invention can be prepared by any convenient method. However, exceedingly good results have been obtained via a new process for their synthesis. This new process comprises adding furfuryl alcohol, a catalyst, and one of the above described isocyanate compounds to a liquid organic solvent. A short time after the above components have been dissolved in the solvent so as to form a homogeneous solution, the components will react and the desired product, namely the furfuryl alcohol blocked isocyanate adduct, can then be collected by any suitable technique as for example filtration or evaporation. The conversions that have been obtained using this process are consistently higher than 80 percent.

The solvent which is used in preparing the blocked isocyanates of this invention must be a liquid material in which the isocyanate, catalyst, and furfuryl alcohol compounds are soluble, at a temperature of about 25° C. to an extent whereby sufficient amounts of reactants will be brought into contact to have a commercially feasible reaction. In addition, the solvent must be a material which will be substantially inert to the reactants and reaction product, and, preferably, a material in which the blocked isocyanate adduct is substantially insoluble. It has been found that liquid organic solvents are excellent materials for use in this invention. The solvent can be aliphatic, aromatic or aliphatic-aromatic and may be straight or branches chained, as well as contain one or more double bonds. Organic solvents which are preferred for use in the blocked isocyanate preparation are esters, ethers, ketones, aromatics and halogenated aliphatics which contain between about 2 to 15 carbon atoms. Specific examples of preferred compounds are toluene, xylene, benzene, ethylbenzene, cumene, p-cumene, ethylacetate, diethyl phthalate, methyl ethyl ketone, methyl isobutyl ketone, chlorobenzene, dichlorobenzene, diethyl ether and diphenyl ether. For economic reasons, toluene is the most preferred solvent.

The above described process is not restricted to the use of any particular reaction temperature or pressure to effect preparation of the blocked adduct. Preferably, atmospheric pressure is employed on the reaction system and no advantage has been recognized in using either subatmospheric or superatmospheric pressure. Likewise, there is no requirement that the solvent and/or reactants be heated to above normal room temperature or approximately 25° C. In fact, high temperatures should preferably be avoided in this process, since it has been found that when the temperature exceeds about 75° C. there is a likelihood that the blocking agent will begin to oxidize and give rise to an oxidation product which is difficult to separate and handle. In addition, after the reaction has started there is a danger at high reaction temperatures that the isocyanate may react with the active hydrogen in the urethane group of a blocked isocyanate adduct rather than with the blocking agent. While the process may be carried out at room temperature, it should be understood that the reaction may be carried out below room temperature, if desired, by cooling the solvent. However, no advantage is apparent at this time to effect the reaction at such subnormal temperature. Reaction temperatures below 10° C. are preferably avoided due to the slow rate of reaction. The reaction which occurs is exothermic and, hence, precaution should be taken to control the temperature. If necessary, external methods of cooling, such as ice baths, can be used in maintaining a proper temperature.

That a blocked isocyanate adduct could be readily synthesized from a room temperature solution of reactants is quite surprising since an unheated solution of a blocking agent such as phenol and an isocyanate will not react to any significant extent. In the process described herein, it is believed that the reaction is triggered by certain catalysts which are a necessary component of the reaction mixture. The catalysts which can be used are selected from the group consisting of lead naphthenate, ferric 2-ethylhexoate, stannous octoate, dibutyltin dilurate, tribultin cyanate, dibutyltin di(2-ethylhexoate), tributyltin o-phenylphenate, sodium trichlorophanate, sodium propionate, potassium oleate, bismuth nitrate, stannic chloride, ferric chloride, antimony trichloride, and mixtures of the foregoing, Other catalysts of comparable or greater activity may also be employed. In general, when mixtures of the foregoing catalysts are employed, the ratios can be varied within the complete range of proportions. The preferred catalyst is lead naphthenate. The quantity of catalyst employed is generally dependent upon its activity and/or the temperature of the reactants. Obviously, more reactive catalysts or higher reactant temperatures require smaller amounts of catalyst. In general, quantities between about 0.05 and 2.0 weight percent of catalyst, based on the combined weight of the isocyanate and furfuryl alcohol components in the reaction mixture, can be used, and preferably between about 0.10 and 1.0 weight percent. The above catalysts are commercially available and are generally obtainable as substantially anhydrous, stable materials. If desired, however, additional water may be removed by conventional procedures such as vacuum stripping. In view of the small quantity of catalyst employed, however, its water content is generally inconsequential.

As mentioned hereinabove, the isocyanate, catalyst, and furfuryl alcohol reactants are added to the solvent which is at about room temperature. These reactants may be added to the solvent in any order and preferably any water in the solvent or reactants is removed prior to the combining of the reactants. Some of the reactants such as the catalyst may be in a solid form when added and, hence, it will be necessary to stir the mixture so as to obtain a homogeneous solution. It has been found that in order to insure that each isocyanate group of the isocyanate compound is blocked, there should be about a 5 percent excess of the blocking agent over the stoichiometric amount required to react with all of the isocyanate groups. Thus, for example, at least 2.1 mols of furfuryl alcohol should be added for each mol of a diisocyanate which is added to the solvent.

It has been found that the reaction involved in this process for preparing blocked isocyanates will take place faster if the solution is agitated as by stirring, and commencement of the reaction may be noted by an increase in temperature of the solution. The blocked isocyanate adduct will subsequently form and termination of the reaction will be evidenced by a cooling of the solution.

As mentioned above, a preferred solvent is one in which the product adduct will precipitate since recovery of the product can then be easily achieved by any convenient filtration technique. The product prepared in such a solvent requires no other treatment as it has been found to be quite pure and free of entrapped foreign matter. Moreover, the use of such a solvent allows the process to be carried out in a continuous manner wherein the reacted solution is put through filter means to separate the product and the filtrate is recycled as solvent.

The polyol component of the composition of this invention contains at least two active hydrogen atoms. Active hydrogen atoms refers to hydrogens which, because of their position in the molecule, displace activity according to the Zerewitinoff test as described by Kohler in J. Am. Chem. Soc., 49, 3181 (1927). The active hydrogen atoms are attached to oxygen, nitrogen or sulfur and representative active hydrogen containing groups include —OH, —SH, —NH, —NH$_2$, —COOH, —SO$_2$OH, —SO$_2$NH$_2$, —CSNH$_2$, —CONH$_2$, and —CONHR where R represents an organic radical. Preferably, all the active hydrogen atoms of the polyol are part of either primary or secondary hydroxyl groups and the polyol is a polyhydric alcohol, polyether polyol, polyester polyol or mixture of the foregoing.

Examples of suitable polyhydric alcohols include polyvinyl alcohol, ethylene glycol, propylene glycol, 1,4-butanediol, 12-hexylenediol, 3-methylene-1, 5-pentanediol, 1,10-decanediol, 1,1,1-tris [2-hydroxyethoxy methyl] ethane, 2,2′-isopropylidenebis(p-phenyleneoxy) diethanol, trimethylopropane, glycerine, hexanetriol, pentaerythritol, sorbitol, sucrose, dimethylolphenol, and tetra(2-hydroxypropyl) ethylenediamine.

Polyester polyols suitable for use in this invention are the reaction products prepared by esterifying together one or more di- or polybasic acids with one or more polyhydric alcohols such as are set forth above. The preparation of such polyesters is a well developed art and, hence, will not be discussed herein. Among the polybasic acids suitable for use in the preparation of polyesters for use in this invention are the benzene polycarboxylic acids including phthalic acid, isophthalic acid, and terephthalic acid, sebacic acid, suberic acid, alkenyl succinic acids, maleic acid, maleic acid-rosin adduct, fumeric acid, malonic acid, adipic acid, pimelic acid, and the corresponding halogenated acids and anhydrides.

Suitable polyether polyols for use in this invention include the reaction products of one or more alkylene oxides having from about 2 to 16 carbon atoms with one or more polyhydric alcohols such as are set forth above. Representative alkylene oxides are ethylene oxide, propylene oxide, 1,2-epoxybutane, 1,2-epoxyoctane, 1,2-epoxyhexadecane, 2,3-epoxyhexane and 1,2-epoxy-3-butene. Mixtures of the above alkylene oxides as well as oxides having cyclic substituents, such as styrene oxide and 1,2-epoxy-2-cyclohexylpropane, may also be used. The preferred polyether polyols for use in this invention have a molecular weight in the range of about 750 to 20,000 and are the reaction products of alkylene oxides containing from 2 to 4 carbon atoms and polyhydric alcohols containing from 2 to 8 hydroxyl group. Examples of such preferred polyether polyols are the polyoxyethylene derivatives of pentaerythritol and trimethyolpropane, the polyoxypropylene derivatives of pentaerythritol, trimethyolpropane, dimethylolphenol, glycerol, hexanetriol, sorbital, tetra (2-hydroxypropyl) ethylene diamine and propylene glycol. Equally preferred are the polyether polyols wherein the polyhydric alcohol is reacted with a mixture of alkylene oxides or in which the polyhydric alcohol is first reacted with, for example, propylene oxide and then with ethylene oxide thereby forming chains consisting of propylene oxide blocks and ethylene oxide blocks. A commercial example of this type of product is PLURACOL TPE 4542.

Especially preferred polyols for use in this invention are water soluble polyether polyols having a molecular weight in the range of 750 to 20,000 and which are composed of hydrophilic and hydrophobic portions. An example of this type of polyether is the PLURONIC series which have the structure

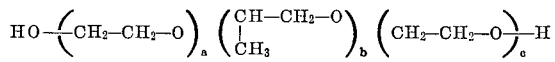

These block polymers are prepared by adding propylene oxide to the hydroxyl groups of a propylene glycol nucleus so as to form a hydrophobic base of at least about 800 in molecular weight. Ethylene oxide is then added to both ends of this hydrophobic base thereby forming polyoxyethylene hydrophilic groups. These hydrophilic groups may constitute anywhere from 10 to 90% of the final molecule.

The resin compositions of this invention can take the form of coatings, adhesives, flexible and rigid foams or sealants. In any event, in order to produce the desired resin composition it is necessary that the polyol and furfuryl alcohol blocked polyisocyanate reactants be heated in the presence of an acid catalyst. Suitable acid catalysts for use in this invention include mineral acid catalysts such as sulfuric acid, hydrochloric acid, hydrobromic acid and nitric acid. Lignin sulphonic acid compounds such as the aqueous dispersion of lignin sulphonic acid and the solid product produced therefrom as taught in U.S. 1,948,858, the sodium salt of a partially desulphonated lignosulphonic acid and the corresponding calcium and potassium salts, and the partially desulphonated ligninsulphonic acids which can be prepared by leaching ligninsulphonic acid with strong acids such as hydrochloric acid. Another type of catalyst which can be used in this invention are the placid polmerization catalysts such as aniline hydrochloride and hydrochlorides of urea, and the acid salts of nitrogen containing organic compounds selected from the class of amines and amides wherein the acid component of the salt is an organic acid having from about 12 to 34 carbon atoms such as lauric acid, stearic acid, oleic acid, dimer acid, phenyl hexonoic acid, lauryl benzoic acid and sebicic acid, or a mineral acid such as described above. Examples of such acid salt catalysts are the acid salts of urea, theourea and substituted ureas such as methyl-, acetyl-, benzoyl-, phenyl-, asymetrical diethyl-, allyl-, 2-chloralkyl-, ethylidene-, and methylol urea; acid salts of other members of the urea system such as quanidine, iminourea, dicyandiamide, giranyl urea, biguanidine, aminoquadine, aminotriazole, creatine, creatinine, quanoline, ethylene pseudosulfocarbamide derivatives and triazine derivatives; acid salts of ethanol amines such as mono-, di-, and triethanolamine, triisopropanolamine, phenyl ethanolamine, ethyl phenyl ethanolamine, phenyl diethanolamine, diethylaminoethanol, ethylene diamines, diethylene triamine, and triethylene tetramine; alkyl amines such as methyl-, trimethyl-, ethyl-, and propylamine; aryl amines such as aniline, benzylamine, acitoacetanilide, morpholine, orthochloroacetoacetanilide and dichloroacetoacetanilide. Yet another type of catalyst which can be used are organic compounds containing a halogenated aliphatic radical from which, upon heating, hydrogen halide is split off. Examples of this type of acid catalyst are the chlorinated hydrocarbons of alphatic, alkylaromatic, and alicyclic materials such as chlorinated kerosene, polyvinyl chloride, tetrachlorotoluol, benzol chloride, chlorinated tri-isobutylene, and chlorinated turpentine; chlorinated aliphatic (including arylalkyl), alkyl-aromatic or alicyclic alcohols such as α-dichlorohydrin, 2-chloroalkyl alcohol, phenyl ethylene chlorohydrin, and β-chloroethyl-benzene alcohol; chlorinated aliphatic alkyl aromatic or alicyclic acids such as chlorinated stearic acid, chlorinated toluic acid, and chlorinated abietic acid; chlorinated aliphatic, alkyl-aromatic or alicyclic ketones and aldehydes such as chlorinated methyl isobutyl ketone, chlorinated 2-ethyl hexene-al, -heptaldehyde, and -fenchone; chlorinated alkyl (including arylalkyl) alkaryl or alicyclic esters of either simple or mixed type, including fatty oils, synthetic resins containing fatty oil acids or other aliphatic, alicyclic or alkyl-aromatic groups or radicals; and alkyl, alkaryl or alicyclic phosphates or cabonates such as chlorinated tricresyl phosphate and chlorinated butyl carbonate. The corresponding organic compounds wherein the halogen is bromide or iodine can also be used. A still further type of catalyst for use in this invention are the Lewis acid catalysts such as aluminum chloride, ferric chloride, zinc chloride, antimony chloride, antimony fluoride, stannic fluoride, and boron fluoride.

It will be appreciated from the foregoing that a wide range of materials can be used as the acid catalyst component in producing the compounds of this invention. Accordingly, the above examples of suitable acid catalysts do not represent a complete listing of such materials but rather are representative of the type of compounds which can be employed. Thus, for example, activated clays and silica gel have also proven to be effective acid catalyts. In any event, it should be understood that an acid catalyst must be used when preparing the compounds of this invention. As mentioned earlier, it was surprisingly found that when the furfuryl alcohol blocked isocyanate was heated to a temperature of about 170° C. the isocyanate unblocked and the isocyanate reactant commenced to react with the polyol component. However, it was observed that the urethane resin product never completely formed or cured and, hence, the furfuryl alcohol blocked isocyanate system behaved totally different from heretofore used blocked isocyanate compositions. Further research revealed that the furfuryl alcohol blocking agent, upon heating, remained in the polymer system and inhibited the isocyanate-polyol reaction. It was then found that the addition of an acid catalyst to the system caused homopolymerization of the furfuryl alcohol which was generated during unblocking and enabled the synthesis of a completely cured resin system composed of both furan and urethane polymeric units. Furthermore, these polymeric units are chemically interconnected, although the exact mechanism and resulting structure is not completely understood at this time, to provide a polymer system having the most desirable properties of each of the individual polymers. For example, the compositions do not have the brittleness associated with furan polymers and, yet, at the same time have a very low degree of water vapor permeability which is in marked contrast to heretofore employed urethane polymers.

The quantity of acid employed in preparing the compositions of this invention is naturally dependent on the particular catalyst selected. However, the quantity of acid employed should be sufficient to provide the reaction mixture with a pH in the range of about 2.0 to 5.5. In general, a pH in this range can be achieved by using from about 0.1 to 3 percent by weight of a mineral acid, about 5 to 50 percent by weight of a lignin sulfonic acid compound, about 10 to 75 percent by weight of a Lewis acid catalyst, a sufficient amount of an organic halogenated aliphatic radical containing compound to provide from 0.1 to 3 percent of the hydrogen halide, or about 10 to 100 percent by weight of an acid salt of a nitrogen containing organic compound. The foregoing weight percentages being based on the combined weight of the furfuryl alcohol blocked polyisocyanate and polyol components.

In preparing the compositions of this invention, all the components can be blended and stored for subsequent use or can be interreacted immediately upon blending. If desired, the components can be dissolved or dispersed in a suitable solvent so as to make subsequent use of the composition reaction mixture more convenient as, for example, in a brushing, dipping or spray application technique. It is also possible through proper selection of reactants to prepare a cured polymer system by spraying the acid catalyst component over the surface of a film of the other polymer components or by passing the other polymer components through an atmosphere of acid catalyst during heating of the reaction mixture.

Naturally, the selection of the polyisocyanate and polyol components will determine the physical and chemical properties of the resultant urethane-furan resin material. Futhermore the basic properties of the resin may be varied by suitable compounding. The amount and type of compounding agent incorporated in the compositions of this invention will depend upon the use for which the composition is intended. Generally speaking, any of the usual compounding agents employed in urethane coatings may be used in the compositions of this invention. Representative of such compounding agents are carbon black, talc, clay, silica, titanium dioxide, plasticizers, zinc and magnesium oxide and calcium and magnesium carbonate. Inorganic and organic coloring agents may be incorporated to give well defined colors to the polymer system. Generally speaking, the compounding agents can be added to the other resin components in any order and at any stage during preparation of the composition of this invention.

It has been found that an isocyanate-polyol reaction catalyst is not necessary to the formation of good urethane-furan polymers from the composition of this invention. However, for certain type of applications where a faster reaction rate is desired, a catalyst may be included in the reaction composition. The catalyst can be blended with the other components at the time the reaction composition is prepared. Any of the compounds conventionally used to catalyst the isocyanate-hydroxyl reaction may be employed, although the metal catalysts are generally preferred in the composition of this invention. Such catalysts are well known to those of skill in the art and a rather complete listing of them appears in Table XXX on pages 167–169 of the book "Polyurethanes: Chemistry and Technology, Part I Chemistry," Saunders and Frisch, Interscience Publishers (1962). When a catalyst is employed, its concentration should be in the range of about 0.1 to 2.0 weight percent based on the combined weight of the polyol and blocked polyisocyanate components.

As mentioned earlier, the compositions of this invention are tough, extremely corrosion resistant and of low water vapor permeability. Accordingly, these compositions are especially valuable in paint, coating and sealing applications. In particular, excellent coating compositions have been prepared from the compositions of this invention by dissolving or dispersing the blocked polyisocyanate, which is water insoluble, acid catalyst and polyol components in water. The proportions of blocked polyisocyanate and polyol components employed in the aqueous coating should be such that the numerical ratio of the number of blocked isocyanate groups to the number of hydroxyl groups is in the range of about 0.6 to 2.0. The amount of water employed in the formation of the dispersion is not critical but should be controlled so that the dispersion viscosity is easy to work with. The dispersions so prepared can be applied to the surface to be coated by any suitable means such as brushing, dipping or spraying. In general, it has been found that dispersions containing from about 20 to 65 weight percent solids, based on the total weight of the dispersion, produce the most satisfactory coatings. The term "solids" is used to denote all the components of the dispersion except water.

In preparing such coating dispersions, it may or may not be necessary to employ an emulsifying agent depending upon the selection of the polyol component. The blocked polyisocyanate component is water insoluble and the polyol component can be either water insoluble or soluble. If a water soluble polyol having both hydrophilic and hydrophobic groups is used, then no emulsifying agent will be needed. Such polyol surfactants, exemplified by the Pluronic series, have been described hereinabove. If a water insoluble polyol or water soluble polyol which is not a surfactant, that is, which does not contain both hydrophilic and hydrophobic groups, is used, then an emulsifying agent is required. Any nonionic emulsifying agent which will give oil-in-water emulsion is satisfactory for use in this inventon. Generally, about 2 to 5 weight percent of emulsifying agent, based on the weight of water employed in the emulsion, will be sufficient. The terminology "oil-in-water" emulsifying agent is well understood in the art and is clearly defined in the book "Surface Active Agents," Schwartz and Perry, Interscience Publishers, Inc. (1949), pp. 342–345. Pages 202–206 of this book describe suitable non-ionic water-soluble oil-in-water emulsifying agents. Examples of such emulsifying agents are: nonylphenylmonoether of polyethyleneether glycol, polyoxyethylene fatty alcohol ether, nonylphenoxy polyethoxyethenol, octylphenoxy polyethoxyethanol, polyethylene glycol monolaurate, polyethylene glycol monooleate, polyethylene glycol dioleate, propylene glycol stearate, polyoxyethylene sorbitan, lauric acid diethanolamide, lauric acid monoisopropanolamide, coco monoisopropanolamide and coconut monoethanolamide.

It will be appreciated that the acid catalyst component of the compositions of this invention can, if properly selected, also function as the emulsifying agent. For example, if a water soluble mineral acid is selected as the acid catalyst then an emulsifying agent would also have to be employed. However, certain of the acid catalysts as described hereinabove would function as both catalyst and emulsifying agent as, for example the organic acid salts of certain of the above described nitrogen containing organic compounds as described under "placid polymerization catalysts."

The preparation of a dispersion coating composition according to this invention is accomplished by merely adding the blocked polyisocyanate, polyol and acid catalysts components to a suitable quantity of water and stirring the mixture. The components of the mixture may be intermixed in any order, that is, the acid catalyst, polyol and isocyanate components may be intermixed and then added to the water or they may be separately added to the water. If an emulsifying agent is required, it also may be blended with the other components in any order. The intermixing and subsequent stirring may be carried out at a temperature in the range of about 20° C. to 90° C. and preferably at about 20° C. to 25° C. (room temperature).

The coating compositions of this invention are used by applying the dispersion to the surface to be coated so as to form a film thereon and then heating this dispersion film to a temperature of at least about 170° C. This heating causes the water in the dispersion to evaporate and the blocked polyisocyanate component to split thereby enabling the isocyanate component to react with the polyol component. The period of heating is not critical and good results have been achieved when the film is heated for about 15 to 30 minutes. Surprisingly, it has been found that the water is essentially all evaporated before the unblocking of the polyisocyanate occurs and therefore, the water does not interfere with the isocyanate polyol reaction.

Another advantage of the aqueous dispersion of this invention is that it can be used to form a relatively thick coating. Heretofore, coatings prepared from prepolymer systems and having a thickness greater than about 10 mils were difficult to form since any carbon dioxide which was generated by the isocyanate reacting with residual water had difficulty in diffusing from the polymer. Accordingly, the polymer coating contained gas pockets which resulted in poor density and adhesion characteristics. However, in the dispersion coatings of this invention wherein no prepolymer is used, any gassing which may occur does not present such a problem since the polyurethane polymer does not form until essentially all the water has evaporated from the system. Good coatings have been obtained when the dispersion layer placed upon the surface to be coated had a thickness as great as about 25 mils.

The following examples will serve to illustrate this invention with more particularity to those skilled in the art and should not be employed to unduly restrict the invention as disclosed and claimed herein. The reactions set forth in the following examples were conducted under atmospheric pressure. The term "conversion" as employed in this specification is defined as follows:

$$\text{Percent Conversion} = \frac{(\text{mols product obtained}) \times 100}{\text{mols reactants charged}}$$

EXAMPLE 1

(A) Preparation of blocked isocyanate adduct

A charge of 1.5 liters of toluene which had been previously dried over calcium sulfate was placed into a 3-liter beaker equipped with a stirrer and thermometer. The toluene which was at a temperature of 25° C. was then stirred and 240 grams of furfuryl alcohol in liquid form was added and completely dissolved in the toluene. Then, 180 grams of liquid tolylene diisocyanate (80% 2,4 isomer, 20% 2,6 isomer) was added to the stirred toluene and in a few seconds a homogeneous solution was obtained. Lastly, 1 gram of catalyst, which was a solution of lead naphthenate (25% lead) in an aliphatic solvent was added. After ten minutes, during which time the solution was stirred, the temperature rose to 27° C. After one hour and continuous stirring the temperature reached 39° C. and a large quantity of white precipitate had formed. Shortly thereafter, the solvent cooled to room temperature and the precipitate was filtered and allowed to dry in air overnight. 365 grams of product was obtained representing a conversion of 95%. The product was the furfuryl blocked adduct of tolylene diisocyanate (TDI) and had a melting point of 140–145° C.

(B) Preparation of dispersion

A urethane coating composition was prepared by blending the following components:

| | Grams |
|---|---|
| Furfuryl Alcohol blocked TDI | 106 |
| Triethanolamine | 27.8 |
| Barium sulfate | 41.7 |
| Iron oxide (Fe₃O₄) | 41.7 |
| Lead silico-chromate | 36.6 |
| Talc | 20.7 |
| Titanium dioxide | 12.6 |
| Arolon 324 [1] | 50.0 |
| Water | 350 |

[1] Arolon 324 is a 43 percent solution of an amine-solubilized polyester prepared from dimer acids, long chain monomeric acids and glycerol which is reacted to an acid equivalent weight of approximately 600.

The above mixture was placed into a ball mill and blended for 16 hours at a temperature of about 22° C. A portion of the resulting dispersion was placed in a jar provided with a cover and stored at a temperature of about 25° C. for three months. At the end of this period the dispersion, after a brief stirring, was perfectly usable.

(C) Application of coating composition

A portion of the above described dispersion was used to form a coating on the surface of several 6″ x 3″ panels made from phosphate coated automobile sheet metal stock. The panels were dipped into the above preparing coating composition so as to form a film thereon which was approximately 0.5 mil in thickness. After dipping, the blanks were allowed to air dry for about 20 minutes at 25° C. and were then placed into an oven which was at a temperature of about 175° C. for 30 minutes. At the end of this time the blanks were coated with an excellent appearing, tightly adhering furan-urethane coating.

(D) Coating properties

The impact resistance of the above prepared coating, as determined through the use of a Gardner Laboratory impact tester, Model IG–1120 was 11 inch-pounds. Its hardness was determined by the Pencil Hardness Test, which is fully described in the Official Digest, W. T. Smith, 374, pp. 232–237, (1956), and measure 6H. The humidity resistance of the coating was excellent and showed no blistering or loss of adhesive after testing for 10 days in accordance with the A.S.T.M. humidity test method designated as D–1735–62. The coating was tested for 240 hours using the A.S.T.M. salt spray test B 117–64 and showed no evidence of failure.

EXAMPLE 2

This example records the successful preparation and use of a furan-urethane coating composition in which the polyol component was N,N,N′,N′-tetrakis (2-hydroxypropyl) ethylene diamine which is marketed commercially under the trademark Quadrol and has the structure:

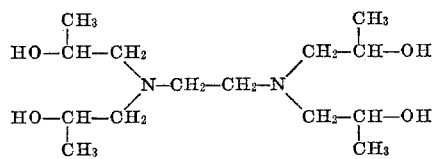

The composition prepared was identical to that shown in Example 1 except that the 27.8 grams of triethanolamine employed therein was replaced with 83 grams of the above identified Quadrol polyol.

A number of panels as described in Example 1 were dipped in the above prepared aqueous dispersion coating composition so as to form a film thereon approximately 0.5 mil in thickness and then air dried and heated as set forth in Example 1. Subsequent inspection showed that a continuous, smooth, tightly adhering coating had been formed, and testing of the coating by the methods set forth in Example 1 provided the following data:

Humidity resistance—No blistering or loss of adhesion after 10 days
Impact resistance—20 inch-pounds
Salt spray—No failure after 240 hours
Hardness—7H A portion of the above prepared dispersion was readily usable after having been stored, as described in Example 1, for three months.

EXAMPLE 3

This example records the successful preparation of a furan-urethane coating composition identical to that of Example 2 except that the N,N,N′N′-tetrakis (2-hydroxypropyl) ethylene diamine polyol used therein was first reacted with 1 equivalent of propylene oxide per hydroxyl group. Accordingly, the composition prepared was identical to that shown in Example 1 except that 96 grams of the propylene oxide-Quadrol adduct was used in place of the 27.8 grams of triethanolamine shown in the formulation of Example 1.

A series of panels were dip coated with the thus prepared aqueous dispersion coating composition so as to form a film thereon approximately 0.5 mil in thickness and the panels were then air dried, heated and subsequently tested as set forth in Example 1. A continuous, smooth, tightly adhering coating was formed on the panel, and the coating, when tested by the methods set forth in Example 1, had a hardness value of 7H, and impact resistance of 40 inch-pounds, and evidenced no salt spray failure after being tested for 240 hours or loss of adhesion or blistering after being tested for humidity resistance for 10 days.

A portion of the above prepared dispersion which was stored as described in Example 1, for 3 months was readily usable.

EXAMPLE 4

This example records the successful preparation and use of an aqueous disperson coating composition identical to that shown in Example 1 except that the triethanolamine polyol used in Example 1 was replaced with 100 grams of a mixture of trifunctional and tetrafunctional straight chain, 3 to 6 carbon atom alcohols having an equivalent weight of 60, and has a molecular weight of about 160, a hydroxyl value of about 1760, a density of about 1.2 grams per millimeter at 75° F. and a viscosity of 20 centistokes at 115° F. This mixture is marketed by the Atlas Chemical Company under the trademark Sutro 170.

A series of panels were dip coated with the thus prepared aqueous disperson coating composition so as to form a film thereon approximately 0.5 mil in thickness and the panels were then air dried, heated and subsequently tested as set forth in Example 1. A continuous, smooth, tightly adhering coating was formed on the panels, and the coating, when tested by the methods set forth in Example 1, had a hardness value of 7H, an impact resistance of 12 inch-pounds, and evidenced no salt spray failure after being tested for 150 hours or loss of adhesion or blistering after being tested for 150 hours or loss of adhesion or blistering after being tested for humidity resistance for 10 days.

A portion of the above prepared dispersion which was stored, as described in Example 1, for three months, was readily usable.

EXAMPLE 5

This example records the successful preparation and use of an aqueous disperson coating composition identical to that shown in Example 1 except that the Arolon 324 catalyst used in Example 1 was replaced with 25 grams of a 50 percent solution of the diethylammonium salt of tall oil. This salt was prepared by adding a solution of tall oil and ethanol to an excess of diethyl amine and then adding sufficient water to make the final concentration of the salt 50 percent.

A series of panels were dip coated with the thus prepared aqueous dispersion coating composition so as to form a film thereon approximately 0.5 mil in thickness and the panels were then air dried, heated and subsequently tested as set forth in Example 1. A continuous, smooth, tightly adhering coating was formed on the panels, and the coating, when tested by the methods set forth in Example 1 had a hardness value of 7H, an impact resistance of 15 inch-pounds, and evidenced no salt spray failure after being tested for 240 hours or loss of adhesion or blistering after being tested for humidity resistance for 10 days.

A portion of the above prepared dispersion which was stored as described in Example 1, for 4 months was perfectly usable.

EXAMPLE 6

A hard-furan-urethane coating is produced from an aqueous dispersion consisting of furfuryl alcohol blocked, 4,4-diphenylmethane diisocyanate, a polyester polyol and a mineral acid catalyst. An example of such a composition is that produced by blending 128 grams of furfuryl alcohol blocked 4,4-diphenylmethane diisocyanate, 94 grams of a polyester polyol prepared by completely reacting 1 mol of succinic acid with 2 mols of trimethylpropane, 0.5 grams of hydrochloric acid, 40 grams of barium sulfate, 40 grams of iron oxide ($Fe_3O_4$) 30 grams of lead silico-chromate, 20 grams of talc, 13 grams of titanium dioxide and 350 grams of water.

The furan-urethane coating is prepared by forming a film of the above composition on the surface to be coated and then heating the film to a temperature of about 175° C.

The furfuryl alcohol blocked adduct of 4,4-diphenylmethane diisocyanate can be prepared by adding 250 grams of 4,4-diphenylmethane diisocyanate to 2.0 liters of diethyl phthalate which is at a temperature of about 20° C. While the diethyl phthalate is stirred, 207 grams of furfuryl alcohol and 4.0 grams of dibutyltin dilaurate are dissolved therein so as to form a homogeneous solution. After about one hour with continuous stirring, the temperature of the solution is about 35° C. and a precipitate is formed. Termination of the reaction is marked by a decline of the solution temperature and the precipitate can then be collected by filtration. 415 grams of the furfuryl alcohol blocked adduct of 4,4-diphenylmethane diisocyanate is obtained representing a conversion of 94 percent.

EXAMPLE 7

This example illustrates the use of lignin sulphonic acid as a catalyst in producing the furan-urethane coatings of this invention. An excellent coating is produced by heating to a temperature of about 175° C. a film formed from a composition consisting of a blend of 102 grams of furfuryl alcohol blocked 1,6-hexamethylene diisocyanate, 83 grams of Quadrol, 18 grams of lignin sulphonic acid, 50 grams of barium sulfide, 30 grams of iron oxide ($Fe_3O_4$), 30 grams of lead silico-chromate, 30 grams of talc and 350 grams of water.

The furfuryl alcohol blocked adduct of 1,6-hexamethylene diisocyanate can be prepared by adding 168 grams of 1,6-hexamethylene diisocyanate to 1.5 liters of xylene which is at a temperature of about 25° C. The xylene is stirred and 244 grams of furfuryl alcohol and 0.8 gram of bismuth nitrate is added to the xylene and dissolved therein so as to form a homogeneous solution. After a period of about one hour, the solution will reach a temperature of about 40° C. and a precipitate is formed. Shortly thereafter, the solvent temperature will start to decrease and the precipitate is then filtered from the solvent system and allowed to dry in air. 348 grams of the dried precipitate, which is the furfuryl alcohol blocked adduct of 1,6-hexamethylene diisocyanate, is obtained representing a conversion of 90 percent.

EXAMPLE 8

This example illustrates the preparation of a furanurethane polymer utilizing a triglyceride polyol and Lewis acid catalyst. An example of such a reaction composition is that prepared by blending 125 grams of furfuryl alcohol blocked polymethylene polyphenyl-isocyanate, 240 grams of castor oil, 75 grams of aluminum chloride, 40 grams of talc, 40 grams of barium sulfate, 20 grams of iron oxide ($Fe_3O_4$), 25 grams of lead silicochromate and 350 grams of water.

The furan-urethane coating is produced by forming a film of the above composition or the surface to be coated and then heating the film to a temperature of about 175° C.

The furfuryl alcohol blocked polymethylene polyphenylisocyanate can be prepared as follows. One liter of cumene having a temperature of about 25° C. is added to a beaker equipped with a thermometer and stirrer. While the cumene is stirred, 390 grams of polymethylene polyphenylisocyanate (marketed by the Carwin Company under the trademark PAPI), 315 grams of furfuryl alcohol and 6 grams of stannous octoate are added and dissolved therein so as to form a homogeneous solution. After one hour and continuous stirring, the temperature of the solution is about 45° C. and a precipitate is formed. Termination of the reaction is marked by a decline of the solution temperature and the precipitate can then be collected by filtration and allowed to dry. 576 grams of the dried precipitate, which is the furfuryl alcohol blocked adduct of polymethylene polyphenylisocyanate, is obtained representing a conversion of 85 percent.

EXAMPLE 9

This example illustrates the use of an acid catalyst consisting of an organic compounding containing a halogenated aliphatic radical which will split off upon heating. An excellent coating is produced by heating to a temperature of about 175° C. a film formed from a composition consisting of a blend of 146 grams of furfuryl alcohol blocked 3,3'-dimethoxy - 4,4' - biphenyl diisocyanate, 200 grams of Pluronic having a molecular weight of about 2100, 1 gram of polyvinyl chloride, 30 grams of talc, 40 of barium sulfite, 35 grams of leadsilico chromate, 12 grams of titanium dioxide, 40 grams of iron oxide ($Fe_3O_4$) and 350 grams of water.

The furfuryl blocked 3,3'-dimethoxy-4,4'-biphenyl diisocyanate can be prepared as follows. One liter of trichloroethylene having a temperature of about 20° C., 296 grams of 3,3'-dimethoxy-4,4'-biphenyl diisocyanate, 220 grams of furfuryl alcohol and 2 grams of sodium trichlorophenate are placed into a 3-liter beaker and continuously stirred for 1.5 hours. At the end of this period a precipitate is formed which when collected totals 488 grams of the furfuryl blocked adduct of 3,3'-dimethoxy-4,4'-biphenyl diisocyanate.

It will be apparent from the foregoing that the objects of this invention have been obtained. New furan-urethane polymer compositions, as well as a process for their preparation, have been provided. These new compositions possess the most advantageous properties of both urethane polymers and furan polymers such properties being heretofore unobtainable in an economical, easily prepared polymer system. Moreover, the new compositions of this invention suffer none of the disadvantages associated with heretofore used blocked isocyanate polymer systems.

We claim:

1. A process for producing a resin comprising heating to a temperature of at least about 170° C. in the presence of an acid catalyst (i) a blocked isocyanate prepared by reacting an organic polyisocyanate and furfuryl alcohol and (ii) a polyol having at least two active hydrogen atoms.

2. The process of claim 1 wherein said blocked isocyanate and said polyol are present in amounts such that the ratio of the number of blocked isocyanate groups to the number of polyol active hydrogen atoms has a value ranging between about 0.6:1.0 to 2.0:1.0.

3. The process of claim 1 wherein said polyol is selected from the group consisting of (a) monomeric polyols, (b) polyester polyols, and (c) polyether polyols having a molecular weight in the range of 750 to 20,000.

4. The resin produced by the process of claim 1.

5. The resin of claim 4 wherein the polyol has a molecular weight in the range of about 62 to 50,000.

6. The resin of claim 5 wherein said polyol is selected from the group consisting of (a) monomeric polyols, (b) polyester polyols, and (c) polyether polyols.

7. The resin of claim 4 wherein said polyisocyanate is selected from the group consisting of tolylene diisocyanate; 4,4' - diphenylmethane diisocyanate; 1,6 - hexamethylene diisocyanate; 3,3'-dimethoxy-4,4'-biphenyl diisocyanate; 3,3'-dimethyl- 4,4'-biphenyl diisocyanate; and polymethylene polyphenylisocyanate.

8. The resin of claim 4 wherein said polyisocyanate is tolylene diisocyanate and said polyol is a polyether having a molecular weight in the range of about 750 to 20,000.

References Cited

UNITED STATES PATENTS

| 2,926,148 | 2/1960 | Leclercq et al. | 260—18 |
| 2,926,157 | 2/1960 | Leclercq et al. | 260—77.5 |
| 2,947,714 | 8/1960 | Leclercq et al. | 260—24 |
| 3,049,552 | 8/1962 | Garber | 260—346.1 |

OTHER REFERENCES

Saunders et al., Polyurethanes, Part II, pp. 485–490 cited as being of interest (1964).

DONALD E. CZAJA, Primary Examiner

M. J. WELSH, Assistant Examiner

U.S. Cl. X.R.

117—132; 260—2.5, 17.5, 24, 26, 29.2, 47, 75